United States Patent
Lohmann

[15] 3,698,496
[45] Oct. 17, 1972

[54] SPRING BALANCE WITH VERTICAL LINEARIZING MEANS

[72] Inventor: Ernst Lohmann, Duisburg, Germany

[73] Assignee: Berkel GmbH, Duisburg, Germany

[22] Filed: May 20, 1971

[21] Appl. No.: 145,324

[30] Foreign Application Priority Data

May 29, 1970 Germany..........P 20 26 309.6

[52] U.S. Cl. ............... 177/230, 177/234, 177/168, 177/246
[51] Int. Cl. ........ G01g 1/18, G01g 3/06, G01g 21/00
[58] Field of Search......177/225, 230, 234, 168-170, 177/246

[56] References Cited

UNITED STATES PATENTS 1,946,775 2/1934 Zwickl..................177/168
3,647,010 3/1972 Beardmore................177/170

FOREIGN PATENTS OR APPLICATIONS 82,134 12/1920 Austria....................177/230
90,481 2/1897 Germany..................177/234
151,061 5/1904 Germany..................177/234
197,260 4/1908 Germany..................177/230
72,108 4/1953 Netherlands..............177/230

Primary Examiner—Robert S. Ward, Jr.
Attorney—Lloyd L. Zickert

[57] ABSTRACT

A measuring instrument of the spring balance type for measuring a mass, through a measurement of force, which includes mounting means for a resilient member counteracting the force that maintains the axis of operation of the resilient member linear along the vertical.

12 Claims, 1 Drawing Figure

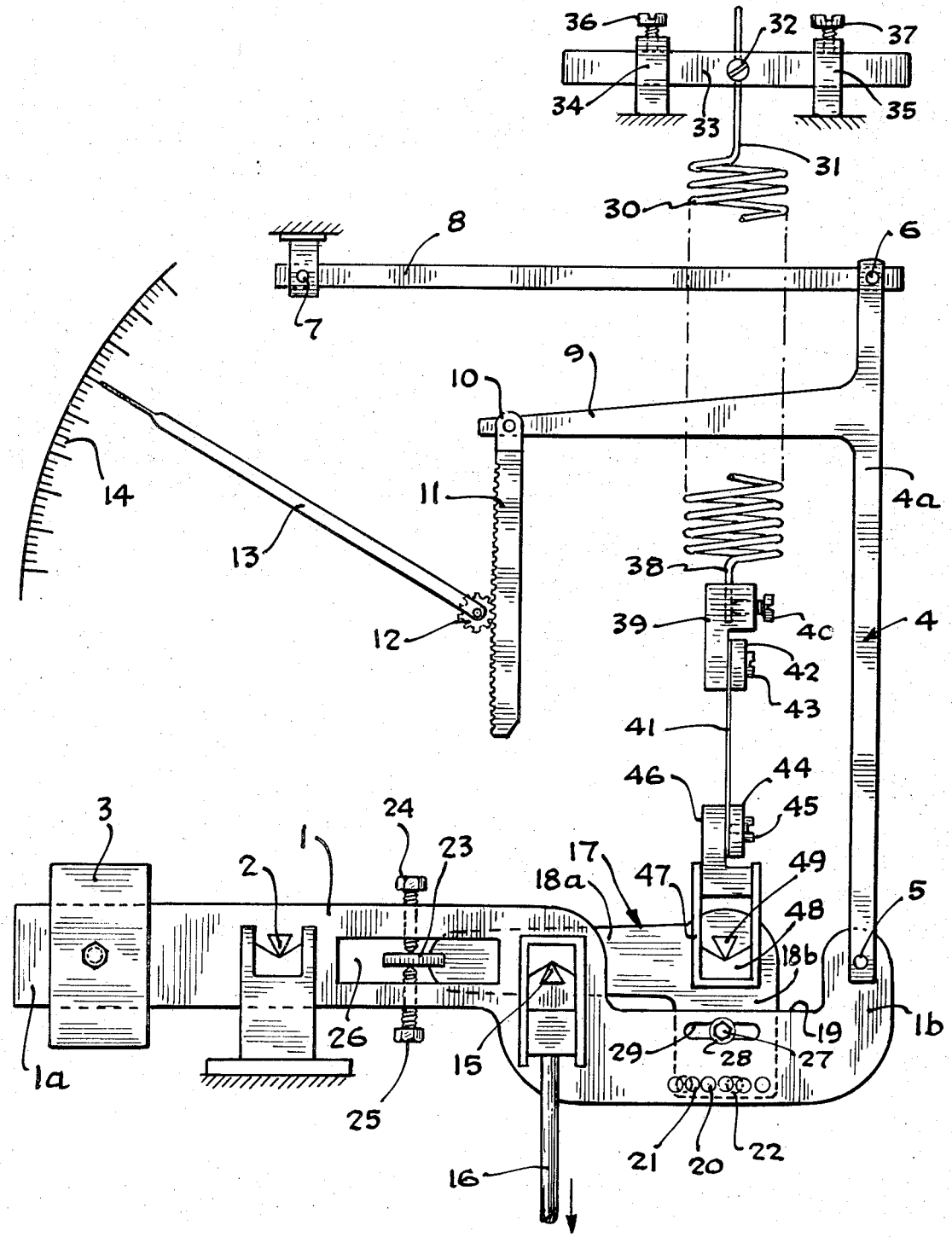

SPRING BALANCE WITH VERTICAL LINEARIZING MEANS

This invention relates in general to an instrument for measuring a mass through the measurement of a force, such as in a weighing scale or a dynamometer, and more particularly to an instrument having an adjustable mounting for a resilient member counteracting the force.

It is known to measure forces by measuring the variation in length of an elastic member, e.g., a coiled spring, subjected to the action of the force. This method is preferably employed in the case of spring balances, which are for this purpose calibrated in units of mass, using standard weights, at the place where the balance is erected, and thus permit of obtaining a measurement of mass through a measurement of force. The difficulty in constructing a spring balance lies in working out an absolutely vertical linear path of movement for the spring when it is expanding and contracting, in addition to which it is essential to obtain, by choosing the most suitable spring material, a minimum of hysteresis and a low temperature dependency of the measuring range.

The invention provides a means of overcoming this difficulty. The measuring instrument of the invention includes a spring balance with a spring serving as a force equalizer, especially a coiled spring with an adjusting device, wherein the ends of the spring are kept clamped in position and their supports can be moved and set transversely to the longitudinal axis of the spring. In this way it is possible to obtain an adjustment which is brought about not only by varying the effective length of the spring or its number of turns, but by shifting the supports of the spring-ends. Because of the rigid fixing of these supports, no variations can be introduced into the measuring system. Should any torsional effect of the spring still occur, it can be countered by incorporating an oppositely acting torsion spring suspension between the end of the spring and its suspension mounting, e.g., in the form of a steel band clamped in position at both ends.

Suspension of the ends of the spring in accordance with the invention is obtainable in that the end of the spring which is fixed in position when the spring is under load is supported on a bar which can be shifted laterally in stationary supports, wherein the end of the spring that follows the variation of its length when under load, is supported in such a manner that it can be shifted laterally and pivoted. The movable end of the spring is connected to the main lever of the spring balance through an adjusting member that can be shifted in position along the main lever for initial adjustment and pivoted about a swivel pin for fine adjustment. Shifting of the adjusting member along the main lever is accomplished by providing a row of holes in the main lever and a row of holes in the adjusting lever and a transferrable swivel pin for engaging an aligned set of holes, one of the main lever and one of the adjusting member. The holes in the adjusting member are spaced apart a greater or lesser distance than holes in the main lever to facilitate adjustment. Fine adjustment is accomplished by a pair of regulating screws or bolts acting on a tongue mounted to the adjusting member to rotate the adjusting member about the swivel pin. expandible Accordingly, it is an object of this invention to provide a support for a balancing spring in a measuring instrument permitting the spring to be adjusted while maintaining it expandable and contractible linearly along a vertical path.

Other objects, features and advantages of the invention will be apparent from the following detailed disclosure, taken in conjunction with the accompanying sheet of drawing, wherein like reference numerals refer to like parts, in which:

The single FIGURE illustrates a somewhat diagrammatic representation of a typical embodiment of the invention in the form of a spring balance having a main lever 1 supported by a stationary knife bearing 2, and including lever arms 1a and 1b. The lever arm 1a carries a flexible counterpoise 3, wherein the lever arm 1b is connected at its free end with a set of rods which transmit its movement to the indicator device of the balance. The set of rods consists of a T-shaped arm 4 whose vertical shank 4a is pivotally connected at its end 5 with lever 1 and at its other end 6 with the free end of a guide rod 8 which is pivotally mounted in stationary bearings at 7. The horizontal shank 9 of the arm 4 carries at its free end 10 a toothed rack 11 engaging with a pinion 12 which carries a weight indicator 13 coacting with a graduated scale 14. The load-scale carrier 16 of the balance is connected through a knife bearing 15, to the main lever 1, at a point intermediate the ends thereof.

A bell-crank lever 17 having a long arm 18a and a short arm 18b functions to adjust the balance. The bell crank lever 17 is adjustably mounted on the main lever 1 and movable longitudinally and rotationally thereof. The adjusting lever 17 is supported on the main lever 1 in the central portion of a U-shaped bend 18 by a transferable swivel pin 20 passing through holes formed in the main lever and the short arm 18b, which swivel pin 20 engages one hole in a row of holes 21 in the main lever 1 aligned with one hole in a row of holes 22 in the adjusting lever 17. The spacing of the holes is the same in each row but different from that of the other row, so that a finer longitudinal adjustment can be obtained when two holes are aligned in order to receive the swivel pin 20. The spacing of holes 22 is one and a half times that of the row of holes 21, although it could be any desired ratio. At the free end of the longer arm 18a of the adjusting lever a tongue 23 is provided which is engaged on opposite sides by two regulating screws 24, 25 carried by the main lever and positioned over each other which can be screwed into mountings adjacent a window-like cut-out 26 of the main lever 1 and function for fine adjustment of the balance. Movement of the regulating screws applies a force to the tongue 23 and causes rotation of the adjusting lever 17 about the swivel pin 20.

Retention of the position of adjustment is obtained by means of a clamping bolt 27 that is received by the adjusting lever 17, which coacts with a disk 28 to overlap an elongated hole 29 in the main lever 1. The hole 29 is of sufficient width with respect to the bolt to avoid obstructing the adjustment movements. Tightening of the bolt 27 clamps and locks the adjusting lever to the main lever against relative movement.

The downward-pulling load therebetween on the load scale carrier 16 transmits a pulling force through the main lever 1 and the adjusting lever 17 to a cylindrical coiled spring 30 whose ends are firmly clamped in position. The top end 31 of the spring is held by a screw 32 on a transverse bar support 33 which extends normal to the longitudinal axis of the spring and is adjustably clamped in stationary supports 34, 35 by set screws 36, 37, wherein the spring end 31 may be adjustably positioned between the supports. The bottom end 38 of spring 30 is firmly clamped in a clamping member 39 by a set screw 40.

A steel band 41 is supported at one of its ends to the clamping member 39 by means of a clamping disk 42 and a bolt 43. The other end of the steel band is clamped in a similar manner, by means of a disk 44 and a bolt 45, to a clamping member 46 of a bracket 47 carrying a bearing 48 of a knife-blade bearing having a knife 49 carried at the junction of the arms of the adjusting lever 17. The steel band 31 counteracts torsional movement of the spring.

A first adjustment of the measuring instrument to change the longitudinal axis of the spring is effected by loosening the clamping bolt 27 and set screws 36, 37 and removing the swivel pin 20 so that the adjusting lever 17 may be shifted on the main lever 1, and the bar 33 which supports the upper end 31 of spring 30 may be shifted along the supports 34, 35. The position of adjustment is first set by inserting the swivel pin 20 in aligned holes of the two rows of holes 21, 22 and tightening the set screws 36, 37. Thereafter, a fine adjustment may be effected by actuating the two adjusting screws 24, 25, to rotate the adjusting lever 17 around the swivel pin 20, wherein the spacing between the knife-blade bearing 48, 49 of the power arm on the adjusting lever 17 and the knife bearing 15 of the load-arm on the main lever 1 can be further changed, while maintaining the same effective spring-length, maintaining the same position of the knife bearings 2 and 15 of the load-arm together with the knife bearings 48, 49 of the power arm on a straight line, and maintaining along the vertical the position of the spring ends 31, 38 with knife bearing 48, 49.

As already mentioned, the construction shown is merely a typical embodiment of the invention which does not restrict the latter; on the contrary, many other embodiments and applications are possible. Thus, any torsion of the spring can also be counteracted by using instead of the steel band, two parallel wires or an extended connecting end of the spring or a reduced number of turns of the spring, or by using springs wound in right-hand and left-hand directions. Then again, the tension spring, instead of being of steel, may be made of some other working material, as for instance rubber. Moreover, instead of having mechanical indication by a pointer, the balance may have optical indication by means of an illuminated image.

It will be understood that modifications and variations may be effected without departing from the scope of the novel concepts of the present invention, but it is understood that this application is to be limited only by the scope of the appended claims.

The invention is hereby claimed as follows:

1. A measuring instrument for measuring a mass through the measurement of a force comprising, a horizontally arranged main lever pivotally supported adjacent one end by a knife bearing, a set of rods including a vertical rod pivoted at one end thereof at the other end of the main lever and at the other end thereof to a restraining link, an indication system corresponding to said set of rods, means for applying the load to be measured to the main lever between the knife bearing and the rod end, a vertically extending resilient member counteracting the load, and adjustable means mounting the resilient member between a fixed support and the main lever so that the operation of the resilient member is always linear.

2. A measuring instrument as defined in claim 1, wherein said load applying means includes a knife bearing connection.

3. A measuring instrument as defined in claim 2, wherein said resilient member is a coil spring.

4. A measuring instrument as defined in claim 3, wherein said adjustable mounting means includes means at the fixed support for shifting laterally the respective end of the spring and means on the main lever for shifting laterally the respective end of the spring.

5. A measuring instrument as defined in claim 4, wherein said means at the fixed support includes a pair of spaced supports slidably mounting a cross bar to which one end of the spring is attached, and set screw means on the support for locking the bar in place.

6. A measuring instrument as defined in claim 5, wherein said means at the movable support includes a bell crank adjustably secured to the main lever, and a knife bearing connection between the bell crank and the spring.

7. A measuring instrument as defined in claim 6, wherein said bell crank includes a short arm extending vertically and a long arm extending horizontally, a horizontal row of holes in the end of the short arm, a horizontal row of holes in the main lever, a swivel pin engaging in a hole of the main lever aligned with a hole of the bell crank, a tongue on the end of the long arm, and a pair of opposed regulating screws on the main lever between which the tongue is received to adjust the bell crank about the swivel pin.

8. A measuring instrument as defined in claim 7, wherein the spacing between the holes in each row is equal while the spacing of the holes in the main lever is different from that of the bell crank.

9. A measuring instrument as defined in claim 8, wherein the spacing of the holes in the bell crank is one and one-half that of the spacing of the holes in the main lever.

10. A measuring instrument as defined in claim 9, and means for locking the bell crank and main lever together following an adjustment.

11. A measuring instrument as defined in claim 10, and means between the movable end of the spring and the knife bearing connection to the resist torsion of the spring.

12. A measuring instrument as defined in claim 11, wherein said torsion resisting means is in the form of a steel band.

* * * * *